UNITED STATES PATENT OFFICE.

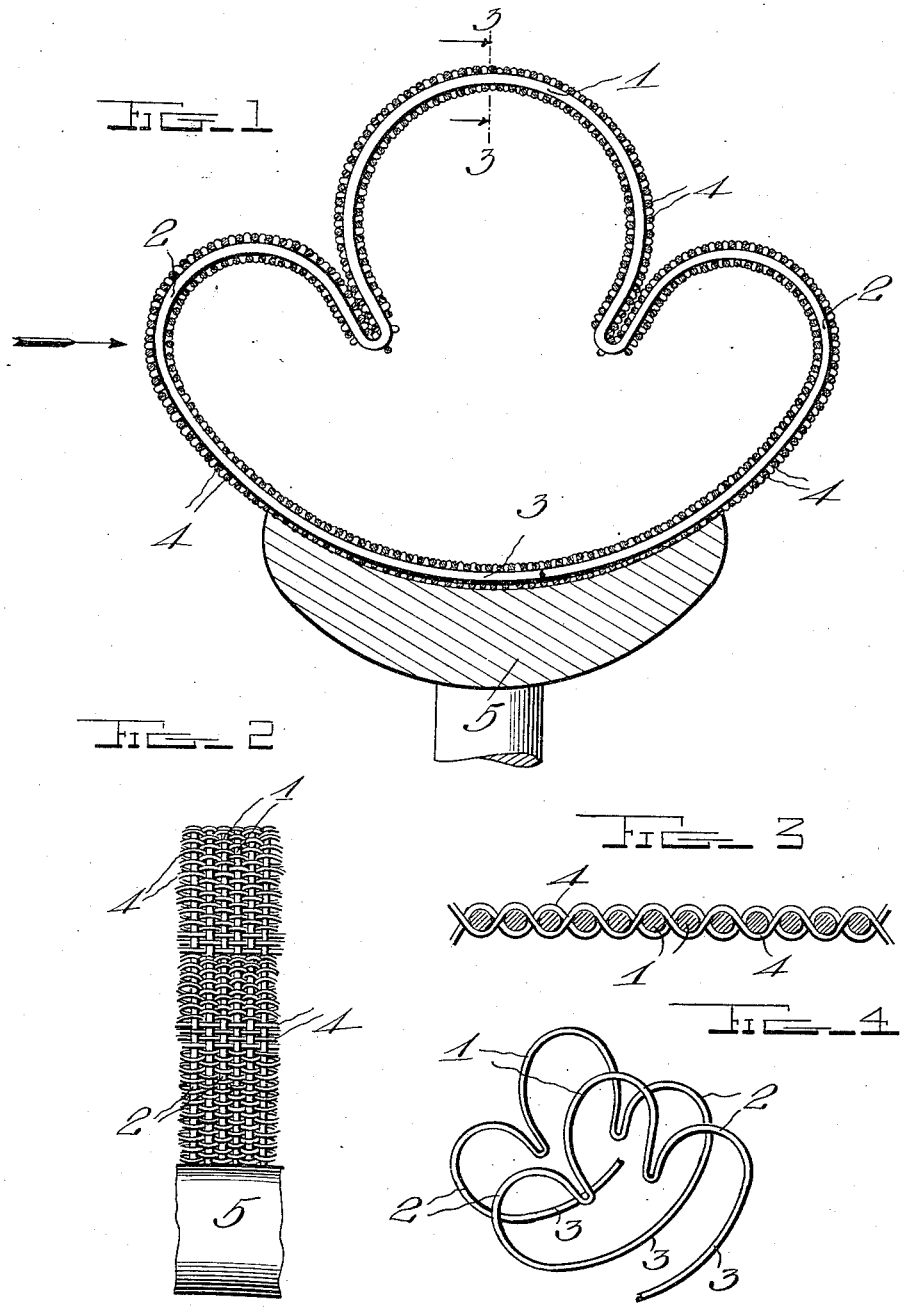

JOSEPH P. KOPETKA, OF BLOOMFIELD, NEBRASKA.

SPRING-TIRE.

997,834.

Specification of Letters Patent. Patented July 11, 1911.

Application filed November 22, 1909. Serial No. 529,231.

*To all whom it may concern:*

Be it known that I, JOSEPH P. KOPETKA, a citizen of the United States, residing at Bloomfield, in the county of Knox and State of Nebraska, have invented certain new and useful Improvements in Spring-Tires; and I do declare the following to be a full, clear, and exact description of the invention, such as will enable others skilled in the art to which it appertains to make and use the same.

The object of this invention is to provide an improved construction of spring tire by means of which the cushioning effect and all of the advantages of a pneumatic tire are produced without the disadvantages and objections found in the latter form of tire.

With the foregoing and other objects in view, the invention consists in certain novel features of the device illustrated in the accompanying drawings, and which will be hereinafter first fully described and then particularly pointed out in the appended claim.

In the accompanying drawings—Figure 1 is a transverse section showing my improved tire applied to a wheel; Fig. 2 is a detail fragmentary view of a portion of the tire and rim; Fig. 3 is a vertical section on the line 3—3 of Fig. 1; Fig. 4 is a perspective view of a portion of the device showing the wire sections drawn apart.

Referring more particularly to the drawing, 1 denotes the main or tread portion of the tire, and 2 the side or supporting springs of the same. The tire shown is constructed from a single rod or piece of wire of suitable size which is bent to form a series of sections, each of which is shaped to form a main or tread portion 1 and side or supporting springs 2 and a curved rim-engaging portion 3.

The sections of the wire forming the tread, side springs and rim-engaging portion, are wound or woven together by longitudinally extending binding wires 4, said wires being of a much smaller size than the wire forming the tire. The inner portion of the tire may be bent in any desired shape to fit the curvature of the rim 5 to which it is to be fitted, and the length of the tire is such that when it is sprung over and around a rim it will be placed under a tension sufficient to hold it in place.

It will be noted that the tire has a continuous tread surface and the retractile tendency of the several sections holds them close together, so that a resilient unpunctured tire is provided that will not take up stones or other foreign matter, and will impart easy riding qualities to the vehicle.

The tire is light, strong and durable and may be manufactured at a slight cost.

Having thus described my invention, what I claim is:

A tire comprising a plurality of narrow transversely bent wire sections arranged closely together, each of which comprises a semi-circular rim-engaging portion, a reduced central tread portion and curved laterally extending spring portions between the tread and the rim-engaging portion, and a plurality of longitudinally arranged fine reinforcing binding wires interwoven between the several transverse sections entirely around the tire including the rim-engaging portion.

In testimony whereof I have hereunto set my hand in presence of two subscribing witnesses.

JOSEPH P. KOPETKA.

Witnesses:
H. C. HARRIS,
E. T. MOODY.

---

Copies of this patent may be obtained for five cents each, by addressing the "Commissioner of Patents, Washington, D. C."